US000001367H

United States Statutory Invention Registration [19]

[11] Reg. Number: H1367

Allen, Jr. et al.

[43] Published: Nov. 1, 1994

[54] WIRE ASSAULT WEAPON WARHEAD

[75] Inventors: Louie A. Allen, Jr.; Tucker T. Yee, both of Ridgecrest, Calif.

[73] Assignee: The United States of America as represented by the Secretary of the Navy, Washington, D.C.

[21] Appl. No.: 651,857

[22] Filed: Feb. 7, 1991

[51] Int. Cl.[5] ..... F42B 12/22

[52] U.S. Cl. ..... 102/493; 102/213; 102/474

[58] Field of Search ..... 102/213, 474, 493

[56] References Cited

U.S. PATENT DOCUMENTS

| | | | |
|---|---|---|---|
| 2,933,799 | 4/1960 | Semon | 102/493 |
| 3,081,704 | 3/1963 | Boswell | 102/493 |
| 3,434,422 | 3/1969 | Herman et al. | 102/474 |
| 4,213,394 | 7/1980 | Brenner | 102/213 |
| 4,556,313 | 12/1985 | Miller, Jr. et al. | 102/213 |
| 4,662,281 | 5/1987 | Wilhelm et al. | 102/493 |
| 5,040,464 | 8/1991 | Pearson | 102/493 |
| 5,131,329 | 7/1992 | Lipo et al. | 102/493 |

FOREIGN PATENT DOCUMENTS

| | | | |
|---|---|---|---|
| 284108 | 5/1915 | Germany | 102/493 |
| 3401249 | 7/1985 | Germany | 102/493 |
| 820519 | 9/1959 | United Kingdom | 102/213 |

*Primary Examiner*—Harold J. Tudor
*Attorney, Agent, or Firm*—Robert J. Hampsch; Melvin J. Sliwka; John L. Forrest, Jr.

[57] ABSTRACT

A wire assault weapon warhead preferably for breaching barbed-wire barricades in a battlefield at standoff distances, has a cylindrical shaped projectile having a domed nose cone and a rear bulkhead sized so as to allow the warhead to be fired from a Shoulder-Fired Multi-Purpose Assault Weapon or a similar weapon. The warhead includes a fragmentation tube that fragments upon the detonation of an explosive charge and the fragments expelled into the wire of the barricade sever the wire and breach the barricade.

18 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WIRE ASSAULT WEAPON WARHEAD

BACKGROUND OF THE INVENTION

The present invention relates in general to a warhead for a field launched weapon and pertains, more particularly, to a warhead for breaching barbed wire barricades. The warhead of this invention is an improvement over the conventional method of breaching a barbed-wire barricade since it is intended to be launched from a Shoulder-Fired Multi-Purpose Assault Weapon (SMAW).

With the conventional weapon it is generally necessary to provide a soldier with a weapon for breaching a barbed-wire barricade in a battlefield in one of the following conventional methods, including cutting the wire with hand tools, setting off a bangalore torpedo or multiple torpedoes under a barbed wire barricade after first assembling and placing the torpedoes into position and setting a detonation fuze, or using a weapon generally referred to as a POMINS that typically requires a two person team to carry and place.

The conventional weapons generate small cubic fragmentations upon exploding, which fragmentations have not been found to be very efficient in cutting barbed wire barricades. Also, the conventional weapons may be relatively easy to detect by an enemy, therefore presenting the further drawback of mission failure and attendant personnel casualties.

SUMMARY OF THE INVENTION

Accordingly, it is an object of the present invention to provide an improved wire assault weapon warhead that is adapted to produce a standoff capability for breaching a barbed-wire barricade in a battlefield. With the warhead of this invention it has been found that a weapon is capable of being fired by an individual foot soldier which will breach a barbed-wire barricade in a battlefield from an extended distance from the barbed-wire barricade.

Another object of the present invention is to provide an improved wire assault weapon warhead that is constructed so as to be small enough and light enough to be carried into a battlefield by an individual soldier.

A further object of the present invention is to provide an improved wire assault weapon warhead that is adapted for use with weaponry commonly used by a foot soldier, such as a Shoulder-Fired Multi-Purpose Assault Weapon (SMAW), to thereby substantially reduce the need for additional weaponry to be carried into a battlefield.

Still another object of the present invention is to provide an improved wire assault weapon warhead that may be readily operated by a foot soldier and be effective in clearing a path through a barbed-wire barricade.

Still a further object of the present invention is to provide an improved wire assault weapon warhead that is adapted to sever a high number of wires of a barbed-wire barricade so as to render the barricade ineffective, thereby allowing friendly troops to easily pass through the perimeter defined by the barbed wire barricade.

Another object of the present invention is to provide an improved wire assault weapon warhead barricade sensor that detects the wire barricade. The warhead is equipped with a detonation circuit that responds to the detection of the barricade by the sensor.

To accomplish the foregoing and other objects of this invention there is provided a wire assault weapon warhead for clearing a path through a barbed-wire barricade in a battlefield. The warhead comprises a cylindrical shaped projectile having a domed nose cone and a rear bulkhead sized so as to allow the warhead to be fired from a Shoulder-Fired Multi-Purpose Assault Weapon (SMAW), or a similar weapon.

In the disclosed embodiment described herein, there is provided a warhead typically including an outer skin tube defining a cylindrical aspect. The warhead further includes a front bulkhead closing the front portion of the outer skin and a rear bulkhead closing or sealing the rear of the cylinder. A nose cone attaches to the front bulkhead and provides a desired aerodynamic aspect of the projectile.

A fragmentation tube within the skin and bulkheads includes a main charge and a communication tube. The main charge, within the inner chamber of the warhead, explodes after the warhead lands on or passes near the target. A target detector detects the presence of the wire of the targeted barbed-wire barricade and initiates the main charge. When the main charge explodes it causes the fragmentation tube to fragment into a plurality of rods traveling in all directions.

Due to the size, shape and velocity of the rods the wire of the barbed-wire barricade is severed. The higher the number of contacts between the rods and the various wires of the barbed-wire barricade the higher number of severed wire.

These and other objects and features of the present invention will be better understood and appreciated from the following detailed description of one embodiment thereof, selected for purposes of illustration and shown in the accompanying drawings.

DETAILED DESCRIPTION

Figure 1:
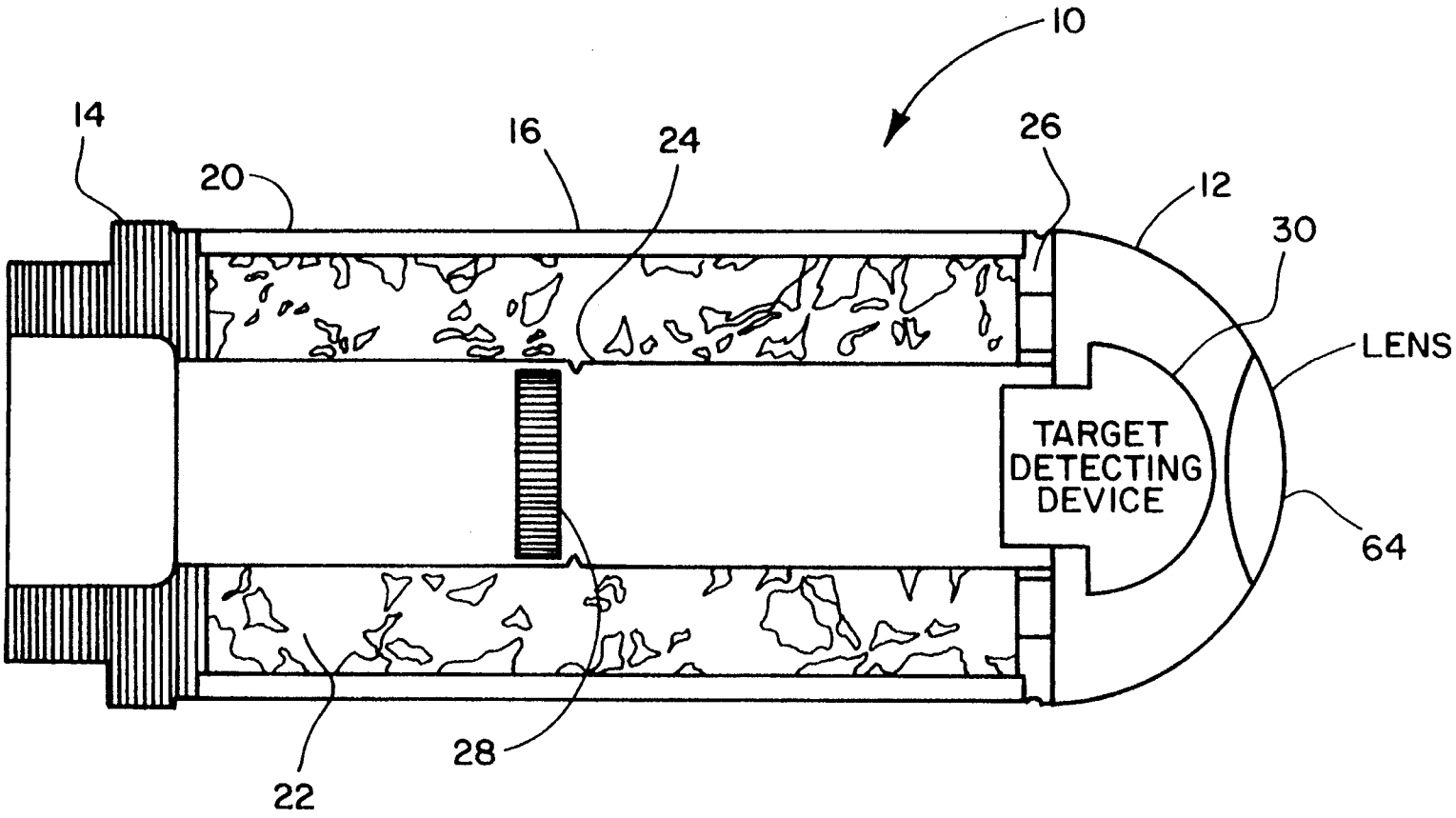
FIG. 1 is a cross-sectional view of a warhead constructed in accordance with the present invention, sectioned in elevation to show the warhead construction.

Referring now to the drawings there is shown a preferred embodiment for the wire assault warhead of this invention. The warhead is described in connection with a SMAW-type weapon for use by soldiers in the field. The warhead of the present invention is particularly adapted for providing ground troops with a weapon against barbed-wire barricades and is characterized by its ease of use and portability.

Referring to FIG. 1, the drawing shows the barbed-wire barricade assault weapon warhead 10 that comprises an overall generally cylindrical shape configuration and has a nose cone 12 at one end and a rear bulkhead 14 at another and opposite end of the cylindrical configuration. An outer frangible envelope means generally defines the exterior shell of the warhead. In a preferred embodiment a skin tube 16 defines the outside of the warhead and gives the warhead 10 its generally cylindrical shape.

In a preferred embodiment the skin tube 16 is typically a thin wall metallic cylinder. Aluminum or a thin walled plastic are preferred materials.

An inner chamber of the assault weapon warhead 10 constitutes the volume enclosed by the skin tube 16, nose cone 12 and rear bulkhead 14. Within the inner chamber is a frangible wall means for expulsion through the outer frangible envelope means. In a preferred embodiment a fragmentation tube 20 is provided as described more fully below. The inner chamber of a preferred embodiment further includes a main explosive charge 22, a communication tube 24, a front bulkhead 26, a booster explosive charge 28 and a target detection device 30.

The design of the fragmentation tube 20 may vary and can be used in the warhead individually or in multiples as desired. The design of the fragmentation tube 20 includes but is not limited to continuous rod fragments, discontinuous rod fragments or controlled fragments. It is desired to have the cylindrical fragmentation tube 20 fit within the inner side of the skin tube 16 with a very close tolerance.

In a preferred embodiment the fragmentation tube 20 reacts to an explosion of the main explosive charge 22 by fragmenting or separating the tube 20 into a number of fragments or rod segments.

Figure 2:
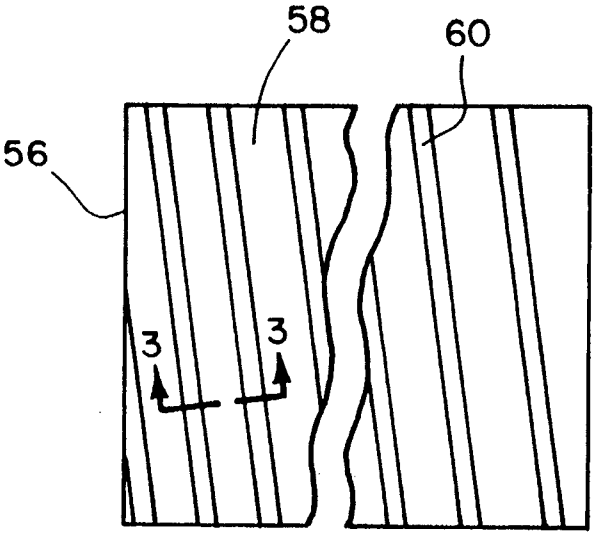
FIG. 2 is an elevation of a fragmentation tube member illustrating generally longitudinal score lines impressed on an internal surface.

The fragmentation tube 20 can be designed so as to separate in any number of different patterns depending upon one or more score means impressed into the fragmentation tube 20. Referring to FIG. 2, there is illustrated a preferred embodiment of the fragmentation tube 20 design having the groove pattern impressed into the internal wall of the fragmentation tube 20, in a discontinuous rod fragment pattern.

Figure 4:
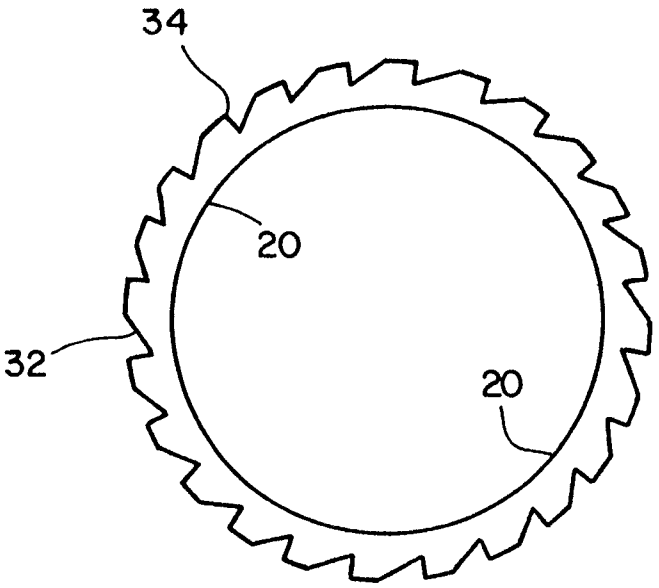
FIG. 4 is an end view of a fragmentation tube embodiment carried within the warhead depicted in FIG. 1, illustrating rods resulting from grooves impressed on an external surface.

The desired pattern is impressed into the fragmentation tube 20. The pattern is impressed such that when the main explosive charge 22 explodes the impressed pattern defines the resulting shape and number of fragments of the exploded fragmentation tube 20. FIG. 4 illustrates the fragmentation tube 20 into which is impressed an external groove pattern. The illustrated pattern has a plurality of grooves 32 impressed therein by cutting external longitudinal grooves into the fragmentation tube 20. Thus, a plurality of rods 34 is defined. In the preferred embodiment, Fig. 2, the fragmentation tube 58 has the groove pattern impressed internally in a discontinuous rod fragment pattern 58.

Referring to FIG. 4, the rods 34 extend substantially the entire length of the fragmentation tube 20. The number of rods 34 will be determined by the number of grooves 32 cut into the fragmentation tube 20.

Upon detonation of the main explosive charge 22 the fragmentation tube 20 separates along the grooves 32 and into a plurality of rods 34. It will now be understood that the grooves 32 have weakened the fragmentation tube 20 so as to induce a desired separation of the fragmentation tube 20 upon detonation of the main explosive charge 22.

In a preferred embodiment the main explosive charge 22 has a generally cylindrical shape. In a preferred embodiment the outside diameter of the main explosive charge 22 is slightly less than the inside diameter of the fragmentation tube 20. This desired arrangement allows for a relatively snug fit approaching a zero tolerance in so far as it can be obtained with conventional manufacturing and assembly techniques.

The main explosive charge 22 is preferably a solid explosive. The explosive will be selected based upon the particular characteristics of the explosive and the design of the warhead of the present invention including the number of fragmentation tubes 20 and the plurality of fragments desired upon detonation of the warhead.

The communication tube 24 dimensions will define the inner diameter of the main explosive charge 22. The communication tube 24 in combination with the rear bulkhead 14 can be adapted to allow construction of a wire assault warhead embodiment of this invention that is adapted to fit a desired launching or firing weapon.

In a preferred assembly of this invention the fragmentation tube or tubes 20, the main explosive charge 22, and the communications tube 24 fit within the skin tube 16 and are held in place by the rear bulkhead 14 and the front bulkhead 26. The rear bulkhead 14 is preferably attached to one end of the skin tube 16 and the front bulkhead 26 is attached to the other end of the skin tube 16.

The nose cone 12 can be attached to the front bulkhead 26 and has an outer diameter preferably the same as the outer diameter of the skin tube 16. The nose cone 12 fits edgewise against the skin tube 16 at its front edge. In a preferred embodiment of the nose cone 12 it attaches in position with the nose cone 12 providing the warhead 10 an aerodynamic design and further to house the target detection device 30.

In a preferred embodiment the target detection device 30 is an active optical system similar to a target detection device (TDD) such as that used in a Sidearm missile. The characteristics of this target detection devices 30 include the use of near infrared light emitting diodes (LEDs) because of their pencil beam characteristics. The pencil beam optical system does not have optical overlap at very close range and has been shown capable of sensing concertina barbed-wire barricades. Other sensors systems tried but not found particularly desirable include an RF system, a metal detector, and a magnetometer.

In a preferred embodiment the TDD uses near infrared light-emitting diodes (LED), an arrangement that should be less expensive than the generally equivalent laser diodes. In a preferred embodiment the LEDs are modulated with an intermediate frequency so as to reduce any effect resulting from a glint from the sun. It is suggested that an amplitude modulation at an intermediate frequency of approximately 80 kilohertz square wave will provide a desired discrimination against natural bright spots such as those caused by the sun or sun glints.

An injection-molded plastic lens 64 provides the sensor's optics, as shown in FIG. 1. In a preferred embodiment the sensor uses side-looking optics in which a pair of light beams each "look" in an opposite direction, that is, 180° apart.

Figure 5:
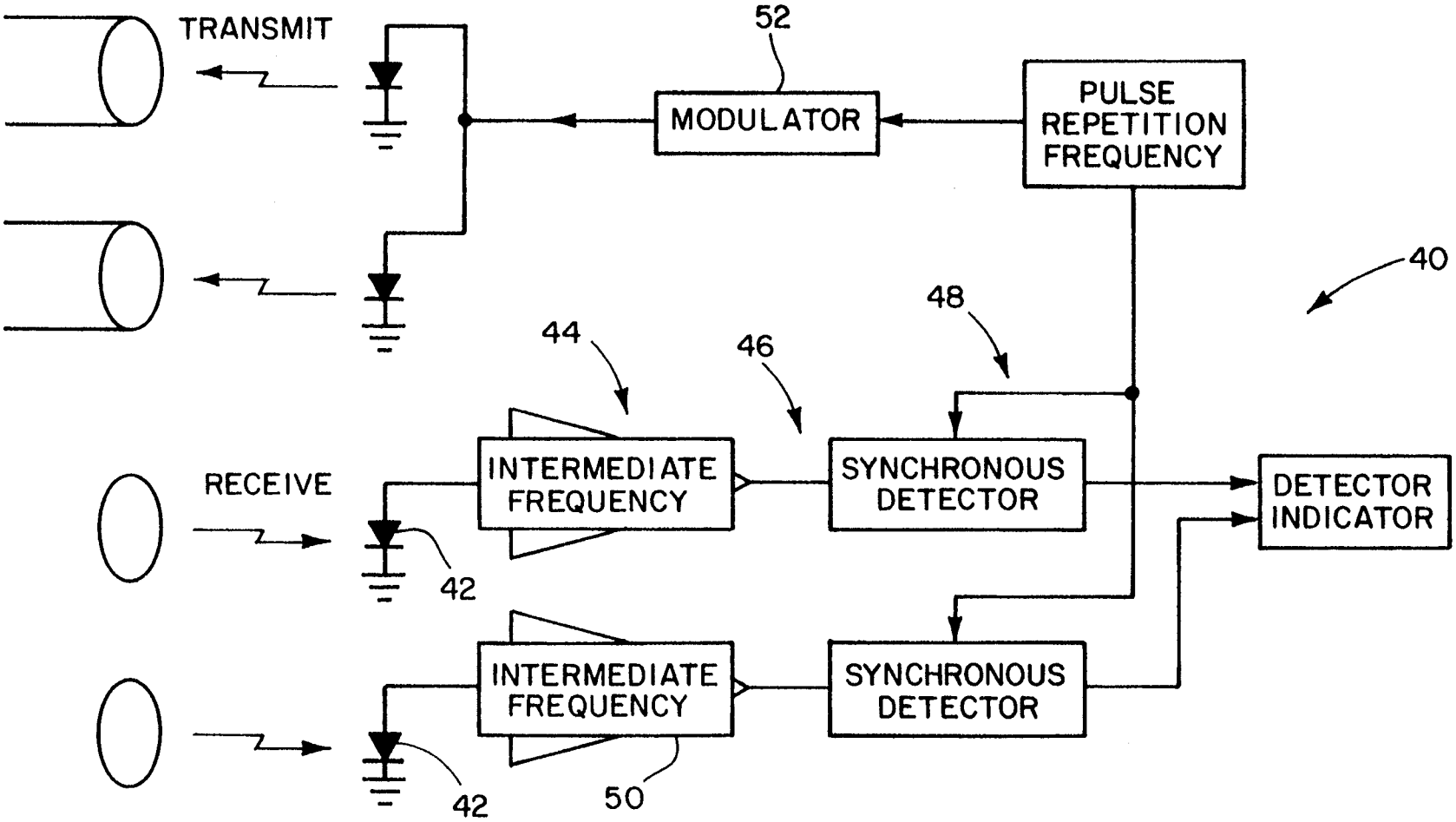
FIG. 5 is a schematic of a preferred embodiment of a target detection device incorporated into the present invention.

Referring to FIG. 5, the target detection device 30 includes a detector or receiver circuit 40 comprising a detector diode 42, a pre-amp 44, a band-pass filter 46, a summing amplifier 48, and phase correction. A return signal is processed by a narrow-band, intermediate frequency amplifier 50. Signal modulation 52 in the transmit mode should cause a receiver circuit 40 to experience less noise from vibration since a majority of vibration frequency spectrum from the SMAW is below approximately 1 kilohertz.

It will be understood that the sensor of the present invention is constructed from conventional sensor technology. This invention does not intend to claim a sensor alone, rather its combination with the warhead.

When the target detection device 30 receives a signal through the receiver circuit 40 that a barbed-wire barricade is proximate the assault weapon warhead 10, the receiver circuit sends a signal through the communication tube 24 to the booster explosive charge 28 detonating it and causing the booster explosive charge 28 to detonate the main explosive charge 22.

When the main explosive charge 22 explodes the fragmentation tube 20 fragments into a plurality of rods 34. The number and shape of the rods 34 are determined by the particular design of the fragmentation tube 20 and the number of fragmentation tubes 20 used. The rods 34 penetrate through the thin walls of the skin tube 16 and are expelled from the assault weapon warhead 10 at a high velocity due to the explosion of the main explosive charge 22. The rods 34 are expelled in all directions and as they travel through the air several encounter the wire of the targeted barbed-wire barricade.

The conventional target detection device 30 initiates the booster explosive charge 28 which initiates the main explosive charge 22 when the wire assault warhead 10 is proximate the targeted barbed wire barricade and within range of the target detection device 30. The target detection device 30 is typically activated once the barbed-wire barricade assault warhead 10 is fired. As the warhead 10 approaches the target the wire is detected and the main explosive charge 22 is detonated.

Figure 6:
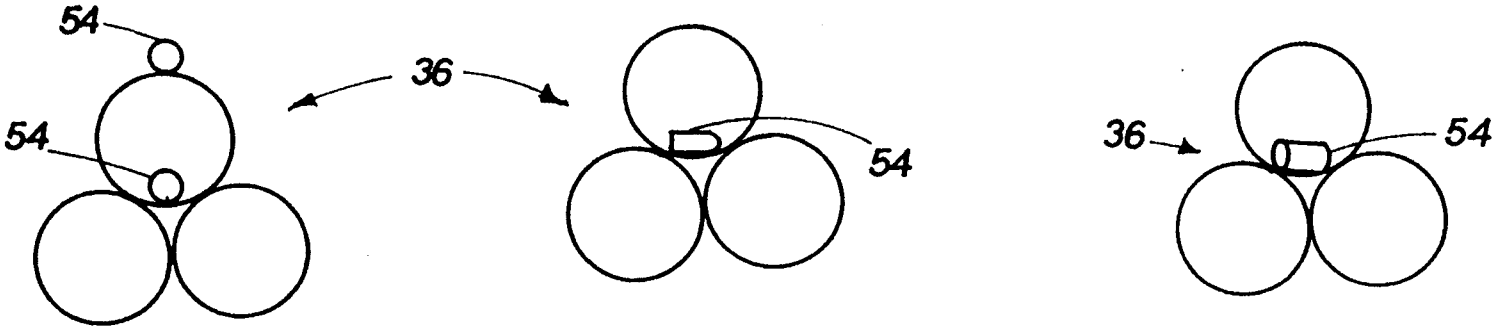
FIG. 6 is a side elevation view of a typical barbed-wire barricade.
Figure 7:
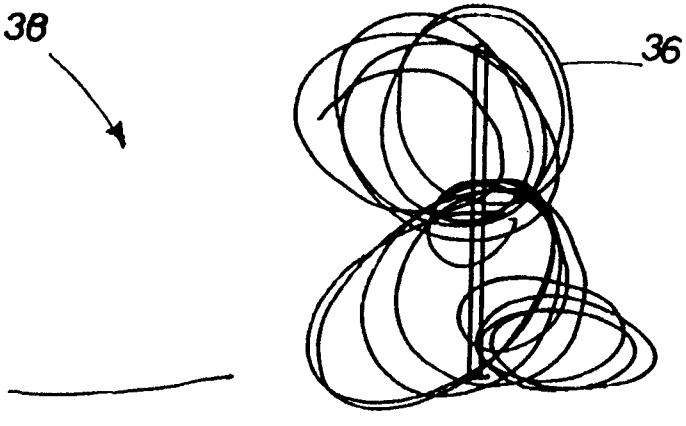
FIG. 7 is an front elevation view of the barbed-wire barricade depicted in FIG. 6 which has been breached by a warhead of the present invention.

In operation the barbed-wire barricade assault weapon previously mentioned is fired with the warhead 10 of the present invention to sever the barbed wire strands and breach the barricade. The warhead approaches a section of triple concertina barbed-wire barricade 36 and the main explosive charge 22 is detonated when within destructive range of the barricade 36. Four possible weapon round locations within conventional concertina barbed-wire are indicated by reference character 54, shown in FIG. 6, depending upon the direction and angle of travel of the warhead 10.

The main explosive charge 22 explodes and causes the fracturing of the fragmentation tube 20 along the grooves 32 impressed into the fragmentation tube 20. The fragmentation rods 34 are expelled through the skin tube 16 by the explosive force of the main explosive charge 22. The rods 34 are expelled along the lines of force of the explosion and burst through the skin 16 at a high velocity in a generally radial pattern in all directions from the wire assault warhead 10.

The rods 34 traveling at a high velocity sever any barbed-wire which they contact. The severed barbed-wire barricade 38 is breached and allows troops to pass through the breach and through the previously protected enemy perimeter.

Figure 3:
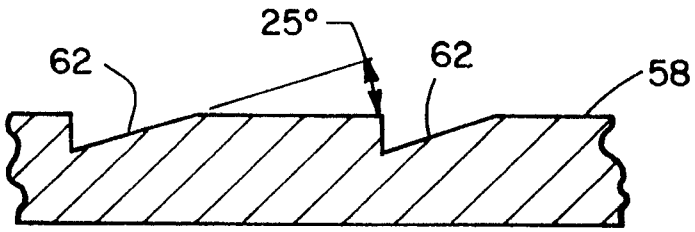
FIG. 3 is a cross-sectional view taken along line 3—3 in FIG. 2.

In a preferred embodiment, as shown in FIG. 2, an internally scored fragmentation tube 56 is divided into lengthwise rods 58 by a plurality of score lines 60. The score lines are scribed with asymmetrical, longitudinal notches 62 (approximately 25°), as shown in FIG. 3, which provides propelling action and fragmentation of the fragmentation tube 20 into rods 58.

From the foregoing description those skilled in the art will appreciate that all of the objects of the present invention are realized. An improved barbed-wire barricade assault weapon warhead has been shown and described for breaching the barbed-wire barricade. The construction of the warhead makes it adaptable for use with a weapon capable of being fired by an individual foot soldier to breach a barbed wire barricade in a battlefield from an extended distance from the barbed-wire barricade.

The wire assault weapon warhead is constructed small enough and light enough to be carried into the battlefield by the soldier and used with a weapon with which the soldier is generally familiar. The purpose of the warhead is to clear a path through the barbed wire barricade by severing a plurality of individual wires of the barbed wire barricade.

While specific embodiments have been shown and described, many variations are possible. The particular shape of the fragmentation rods and the pattern into which they fragment may be changed as desired to suit the barricade to be breached, the weapon, or the particular battlefield conditions with which the warhead is used. The configuration of the warhead may vary although the preferred embodiment is generally cylindrical. Also, in the embodiment described the warhead is intended for firing from a SMAW-type weapon.

In another embodiment double-thick fragmentation tubes 20 are scored, either internally or externally, for fragmentation upon detonation of the main explosive charge 22.

The warhead may be modified for firing from other type of weaponry without departing from the design features and spirit of this invention.

Having described the invention in detail, those skilled in the art will appreciate that modifications may be made of the invention without departing from its spirit. Therefore, it is not intended that the scope of the invention be limited to the specific embodiment illustrated and described. Rather, it is intended that the scope of the invention be determined by the appended claims and their equivalents.

What is claimed is:

1. A warhead for breaching a barbed-wire barricade, comprising:

a projectile capable of being launched from a weapon, the projectile comprising:

an outer frangible envelope means for defining an exterior surface of the projectile and an inner chamber;

an inner frangible wall means within the inner chamber, score means defined by the inner frangible wall means; and explosive means for fragmenting the inner frangible wall means into fragments and expelling the fragments through the outer frangible envelope means.

2. A warhead as set forth in claim 1 wherein the outer envelope means is a relatively thin walled tubular member.

3. A warhead as set forth in claim 2 further comprising:

means for detecting a wire barricade proximate the detecting means; and means for detonating the explosive means upon detection of the proximate wire barricade.

4. A warhead as set forth in claim 3 wherein the detonating means is a booster explosive charge located in the inner chamber and operatively connected with the detecting means.

5. A warhead as set forth in claim 4 wherein the inner frangible wall means is generally tubular with generally longitudinal score lines impressed into the tube.

6. A warhead as set forth in claim 5 wherein the relatively thin walled tubular member is plastic.

7. A warhead as set forth in claim 5 wherein the relatively thin walled tubular member is aluminum.

8. A warhead for breaching a barbed-wire barricade, comprising:

a projectile including an outer frangible envelope defining an inner chamber and an inner frangible member within the inner chamber;

a fragmentation member incorporating the inner frangible member and associated score lines impressed into the inner frangible member; and a main explosive charge for fragmenting the fragmentation member into fragments and expelling the fragments through the outer frangible envelope.

9. A warhead as set forth in claim 8 wherein the outer frangible envelope is a relatively thin walled tubular member.

10. A warhead as set forth in claim 9 further comprising:

a sensor carried in a nose cone portion of the warhead, the sensor detecting a wire barricade proximate the sensor; and an explosive booster charge responsive to the sensor, the explosive booster charge detonating the main explosive charge upon detection of the proximate wire barricade.

11. A warhead as set forth in claim 10 wherein the outer frangible envelope and the inner frangible member are assembled with a minimum of intermediate clearance.

12. A warhead as set forth in claim 11 wherein the fragmentation member is generally tubular with generally longitudinal score lines impressed into the tube.

13. A warhead as set forth in claim 12 wherein the relatively thin walled tubular member is plastic.

14. A warhead as set forth in claim 12 wherein the relatively thin walled tubular member is aluminum.

15. A method of breaching a barbed-wire barricade by a weapon launched warhead assembly, which comprises:

launching a projectile including an outer frangible envelope defining an inner chamber, an inner frangible member within the inner chamber, a fragmentation member incorporating the inner frangible member and associated score lines impressed into the inner frangible member;

detonating the projectile;

fragmenting the inner frangible member as a result of the detonation;

ejecting the fragments through the outer frangible envelope with the force of the detonation; and severing the wire portion of the barbed-wire barricade with the ejected fragments.

16. A barbed-wire barricade breaching method as set forth in claim 15, further comprising detecting a barbed-wire barricade proximate the projectile.

17. A barbed-wire barricade breaching method as set forth in claim 16 further comprising detonating a booster explosive charge located in the inner chamber in response to the detection of the barbed-wire barricade.

18. A barbed-wire barricade breaching method as set forth in claim 17, further comprising detonating the explosive means as a result of the detonation of the booster explosive charge.

* * * * *